(12) United States Patent
Woodhouse et al.

(10) Patent No.: US 8,808,429 B2
(45) Date of Patent: Aug. 19, 2014

(54) METHOD FOR RECLAIMING OF $CO_2$ ABSORBENT AND A RECLAIMER

(75) Inventors: Simon Woodhouse, Strommen (NO); Otto Morten Bade, Stabekk (NO); Anne-Helene Haaland, Nesoddtangen (NO); Oddvar Gorset, Roa (NO); Bjorn Magnus Berg, Oslo (NO)

(73) Assignee: Aker Clean Carbon AS, Oslo (NO)

( * ) Notice: Subject to any disclaimer, the term of this patent is extended or adjusted under 35 U.S.C. 154(b) by 405 days.

(21) Appl. No.: 13/375,896

(22) PCT Filed: Jun. 9, 2010

(86) PCT No.: PCT/EP2010/058069
§ 371 (c)(1),
(2), (4) Date: Feb. 9, 2012

(87) PCT Pub. No.: WO2010/142716
PCT Pub. Date: Dec. 16, 2010

(65) Prior Publication Data
US 2012/0125196 A1    May 24, 2012

(30) Foreign Application Priority Data
Jun. 9, 2009  (NO) .................................. 20092229

(51) Int. Cl.
*B01D 53/14*        (2006.01)

(52) U.S. Cl.
USPC ................... 95/183; 95/193; 95/209; 95/236

(58) Field of Classification Search
None
See application file for complete search history.

(56) References Cited

U.S. PATENT DOCUMENTS 3,829,521 A  *  8/1974  Green .............................. 5/161
5,389,208 A  *  2/1995  Beasley et al. .................. 203/11
2007/0148068 A1 * 6/2007 Burgers et al. ................ 423/220
2011/0088553 A1 * 4/2011 Woodhouse et al. ........... 95/162
2013/0206000 A1 * 8/2013 Iijima et al. ...................... 95/19

FOREIGN PATENT DOCUMENTS

EP              1967250 A1    9/2008
WO     WO-2008/063079 A2    5/2008

OTHER PUBLICATIONS

Burkhardt, Thorsten, "International Search Report" for PCT/EP2010/058069, as mailed Sep. 9, 2010, 5 pages.
Kohl, A.L., et al., "Gas Purification, Fifth edition, Chapter 3: Mechanical Design and Operation of Alkanolamine Plants", Jan. 1, 1997, Gas Purification, Fifth Edition, Gulf Publishing Company, Houston, Texas, 10 pages.

* cited by examiner

*Primary Examiner* — Duane Smith
*Assistant Examiner* — Pankti Patel
(74) *Attorney, Agent, or Firm* — Winstead PC

(57) ABSTRACT

A method for reclaiming CO2 absorbing chemical(s) from a lean aqueous CO2 absorbent leaving a regeneration column (8), where lean absorbent (30) is withdrawn and flashed (31) to generate a vapor that is compressed (34) and returned into the regeneration column as stripper gas (37), where a part of the lean absorbent (20) is withdrawn and introduced into a reclaimer (21) in which the lean absorbent is boiled to generate a gas phase (23) that is withdrawn and returned into the regeneration column as reclaimed absorbent, and a liquid phase containing impurities (24), wherein the gaseous phase that is withdrawn from the reclaimer is compressed (34) together with the vapor part (33) from the flashing of the lean absorbent, to generate a pressure in the reclaimer that is lower than the pressure in the regeneration column, and a reboiler (11) for carrying out the method, are described.

5 Claims, 3 Drawing Sheets

METHOD FOR RECLAIMING OF $CO_2$ ABSORBENT AND A RECLAIMER

TECHNICAL FIELD

The present invention relates to the field of $CO_2$ capture. More specifically the invention relates to the field of removing heat stable salts and other degradation products from an amine absorbent.

Most specifically, the invention relates to a method for removal of heat stable salts and other degradation products from an amine absorbent and a device for performing the method.

BACKGROUND ART

The present invention relates to a sub-method of a prior known method for $CO_2$ capture such as plants described as part of the prior art in the applicants own patent application WO 2008/06379 A (AKER CLEAN CARBON AS) May 29, 2008.

Different absorbents are used and/or proposed in the process to absorb $CO_2$. The selection of the absorbent will typically be based upon energy cost, construction cost, and emission limit. The absorbents are typically aqueous solutions of one or more $CO_2$ absorbing chemicals. Typical $CO_2$ absorbing chemicals used for the currently used $CO_2$ absorbents include amines and carbonates. Typical amines are MEA, DEA, AMP, MDEA, MMEA, AEP and piperazine. Many of these absorbents degrade slowly during the absorption process. Amine solutions degrade by reaction with oxygen, carbon dioxide, sulphur compounds, nitrous oxides and other impurities found in the exhaust gas. The reaction products include heat stable salts and other degradation products. Degradation of the amine results in a reduced active amine concentration and hence reduces the efficiency of the process. Continuous make-up of amine may be required to replace degraded amine.

In addition to the $CO_2$ absorbing chemicals, the absorbent may include different other chemical compounds. The additional chemical compounds may include de-foamers, corrosion inhibitors etc.

The concentration of degrading products in the amine solution should be restricted. Degrading products are often corrosive and reduce the efficiency of the system. Typically a maximum concentration of degradation products is set between 2% and 10%.

The process of separating impurities, degraded solvent and heat stable salts from the absorbent that may be cycled into the absorption/desorption cycle is often referred to as reclaiming of the absorbent.

There are several methods for removing degradation products from the amine system. Typically a side stream is withdrawn from the amine system and sent to a purification system. The purification system removes some of the degradation products and the purified amine is returned to the amine system. These systems can operate continuously, semi-continuously or batch. Typical methods and technology used for purification include thermal reclaiming, adsorption, ion exchange, membranes and electro dialysis.

In a thermal reclaiming system a fraction, typically 0.5 to 5%, of the lean and hot absorbent leaving the regenerator is bled off and heated further in a reclaimer. Alkali is preferably injected into the reclaimer. The alkali is added to liberate and recover molecular amine from the heat stable salts. In the reclaimer the absorbent is heated further to evaporate the amine together with steam. The evaporated amine and steam is withdrawn and introduced into the stripper, or regeneration column, in the absorption desorption cycle of the capture plant.

The reclaimer is often a kettle type unit and is typically heated by steam. Normally, the reclaimer operates at the same pressure as the stripper so that vapours generated in the reclaimer can be fed directly to the stripper. Considerable heat is required by the reclaimer, however this heat is not lost from the system as the vapour are returned to the stripper. High boiling point components and salts build up in the reclaimer. As the concentration of these components increase, the boiling point of the mixture increases and hence the operating temperature of the reclaimer increases. The fluid in the reclaimer is removed in a drain and sent to disposal.

EP 1967250 A (MITSUBISHI HEAVY INDUSTRIES, S, LTD) Jan. 17, 2008 relates to a CO2 recovery system and a method for removing solid particles for use in the system. The method for removal of solid particles comprises a filtering unit for removal of solid particle from the circulating lean solvent. The retentat from the filter(s) is removed from the filter(s) by backwashing with backwash water. The backwash water including the particles removed from the filters is then introduced into an evaporator where the dispersion of particles in the backwash water is heated to evaporate any free amine and steam that are introduced into the regeneration column as stripping gas, and the remaining more concentrated suspension in the evaporator is withdrawn and introduced into a reclaimer where the particles are further concentrated by heating and generation of steam that is withdrawn and introduced into the regeneration column as stripping gas. The further concentrated suspension is removed from the reclaimer to be deposited. There is no indication in EP1967250 on flashing of lean absorbent or lowering of the pressure in the reclaimer to improve reclaiming. The question of the need to reduce the pressure and thus the temperature in the reclaimer is not discussed.

Thermal reclaiming at the stripper operating pressure is no option for amines having a high boiling temperature. The temperatures required to reclaim these amines would result in very high degradation rates within the reclaimer. Operating the reclaimer at high temperature will result in scaling of the heat transfer area, increased amine degradation in the reclaimer and possible production of gaseous decomposition products that are returned to the stripper.

It is therefore advantageous to operate the reclaimer at lower temperatures. The most common method of reducing the reclaimer operating temperature is to reduce the reclaimer operating pressure. This is often called vacuum reclaiming. An additional advantage with low temperature reclaiming is that a lower temperature heating medium can be used. Low temperature heating mediums usually have a lower cost than higher temperature heating mediums.

U.S. Pat. No. 5,389,208 A (CANADIAN CHEMICAL RECLAIMING, LTD) Feb. 14, 1995 describes a process for reclaiming and/or concentration of aqueous solutions of chemicals, such as alkanolamines used for removal of acid components in natural gas. A combination of temperature and vacuum is used to evaporate water and/or alkanolamine for recycling to the absorption process.

Low pressure or vacuum reclaiming requires the introduction of a compressor system or vacuum pump system. Vacuum pump systems involve condensing most of the vapour and therefore are not energy efficient. Using a compressor will reduce the energy consumption considerably, however the capital cost associated with a dedicated compressor normally excludes this option.

Accordingly, there is a need for a method and a device for vacuum or low pressure reclaiming having a reduced energy requirement compared to use of a vacuum pump but where the capital cost of the solution is lower than installing a dedicated compressor.

DISCLOSURE OF INVENTION

According to a first aspect, the invention relates to a method for reclaiming one or more $CO_2$ absorbing chemical(s) from a lean aqueous $CO_2$ absorbent leaving a regeneration column in which $CO_2$ has been released, or desorbed, from the $CO_2$ absorbent, and the released $CO_2$ is withdrawn from the top of the regeneration column for further treatment, and the lean, or $CO_2$ depleted absorbent, is collected at the bottom of the regeneration column and withdrawn therefrom, where at least a part of the lean absorbent leaving the regeneration column is introduced into a reboiler where the absorbent is heated to generate steam and vaporized absorbent that is introduced into the regeneration column as stripping gas, where lean absorbent is withdrawn and flashed to generate a vapour that is compressed and returned into the regeneration column as stripper gas, and a liquid phase that is returned to an absorption column, and where a part of the lean absorbent is withdrawn and introduced into a reclaimer in which the lean absorbent is boiled to generate a gas phase that is withdrawn and returned into the regeneration column as reclaimed absorbent, and a liquid phase containing impurities, heat stable salts, and degradation products from the absorbing chemical(s) and other chemicals, wherein the gaseous phase that is withdrawn from the reclaimer is compressed together with the vapour part from the flashing of the lean absorbent, to generate a pressure in the reclaimer that is lower than the pressure in the regeneration column.

According to a second aspect, the present invention relates to a regenerator for a liquid absorbent for $CO_2$ comprising a regeneration column, a rich absorbent line for introduction of rich absorbent into the regeneration column, withdrawal means for withdrawing lean adsorbent from the bottom of the regeneration column, a reboiler for heating at least a part of the withdrawn absorbent to produce steam that is reintroduced into the regeneration column, a first lean absorbent line for leading a second portion of the lean absorbent from the mentioned withdrawal means to a flashing means, a steam withdrawal line for withdrawing the gaseous phase from the flashing means, compression means (34) for compressing the gaseous phase in line, and a line for injecting the compressed gaseous phase into the regeneration column, and a second lean absorbent line for withdrawing the liquid phase from the flashing means for returning the lean absorbent to an absorption device; and a gas withdrawal line for withdrawal of $CO_2$ and vapour from the top of the regeneration column, and separation means for separating the gas withdrawn from the top of the regeneration column in a $CO_2$ stream that is exported from the regenerator, and water that is recycled to the regeneration column, characterized in that it further comprises a reclaimer line for withdrawal of a portion of the lean absorbent and introduction of the lean absorbent into a reclaimer, heating means for heating the lean absorbent in the reclaimer, a reclaimer withdrawal line for withdrawing a gaseous phase generated in the reclaimer and introducing said gaseous phase into the compressing means, and an amine waste line for withdrawing waste amine from the reclaimer for deposition.

DETAILED DESCRIPTION OF THE INVENTION

Figure 1:
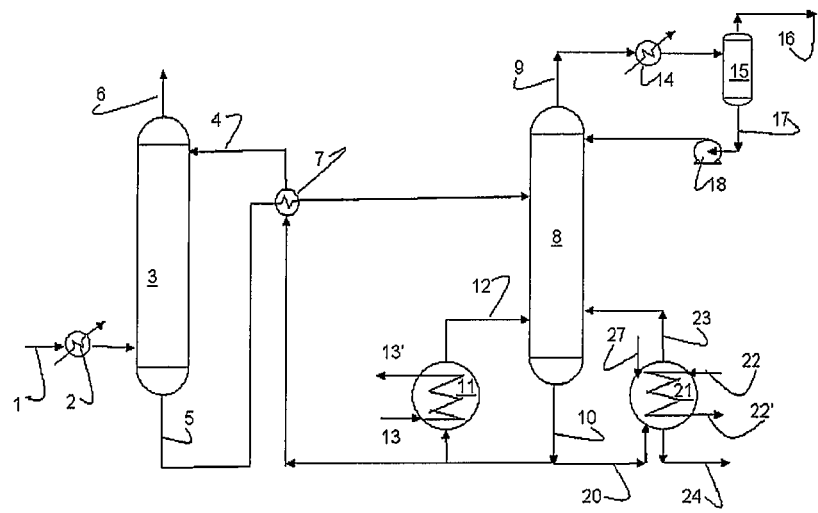
FIG. 1 is a principle sketch of a $CO_2$ capture plant according to the prior art.

FIG. 1 is a principle sketch of a $CO_2$ capturing plant according to the prior art. Exhaust gas from combustion of carbonaceous fuel enters the $CO_2$ capturing plant through an exhaust line 1. The temperature of the exhaust entering the $CO_2$ capturing plant through line 1 is normally from about 120° C. to about 40° C., through cooling of the exhaust gas to produce steam for several purposes. The exhaust gas from line 1 is optionally introduced into a cooling section 2 in which it is saturated with water and cooled to a temperature e.g. from about 35° C. to about 60° C.

The cooled and humidified exhaust gas is then introduced into the lower part of an absorption tower 3 in which the exhaust gas flows from the bottom to the top of the absorption tower 3 countercurrent to a lean absorbent, i.e. absorbent that is stripped for $CO_2$, that is introduced into the upper part of the absorption tower through a lean absorbent line 4. Lean gas, i.e. exhaust gas where a substantial part of the $CO_2$ is removed, is removed through a gas exit line 6 at the top of the absorption tower, whereas rich absorbent, i.e. absorbent having absorbed $CO_2$, is removed from the absorption tower through a rich absorbent line 5.

The rich absorbent is heated against lean absorbent that is returned to the absorption tower in a heat exchanger 7 to a temperature typically in the range between 90 and 110° C., before the rich absorbent is introduced into a regeneration column 8.

In the regeneration column 8 the rich absorbent flows downwards, countercurrent to steam generated by heating some of the absorbent in a regeneration reboiler 11. Lean absorbent leaves the regenerator column through a lean absorbent outlet 10. A part of the lean absorbent in the outlet 10 is introduced into the regeneration reboiler 11 where it is heated to a temperature typically in the range between 115 and 130° C., to produce hot absorbent, CO2 and steam which is re-introduced into the regenerator column through a line 12. The lean absorbent in the reboiler 11 is typically heated by means of electricity, or a heating medium, such as e.g. steam. When using a heating medium for heating the absorbent in the regeneration reboiler is introduced through a line 13 and removed through a line 13'. Steam as a heat medium for the reboiler is normally introduced as a high pressure steam at a temperature of 130° C. to about 140° C., and leaves through line 13' as condensed steam at the same temperature. In other words, the energy transferred from the heat medium to the absorbent in the reboiler is the heat of condensation of the steam.

The heating of the column from the bottom gives a temperature gradient at steady state from the bottom to the top of the column, where the temperature at the top is from 10 to 50° C. lower than at the bottom, depending on the actual design of the column. In a typical regeneration column the temperature at the bottom of the column is about 120° C. and the temperature at the top of the column is about from 10 to 50° C. lower than at the bottom of the column.

The lean absorbent in line 10 that is not introduced into the regeneration reboiler, is recycled back to the absorption column 3 through the line 4 and cooled in the heat exchanger 7 against rich absorbent in the line 5. In the heat exchanger 7 the relatively cold rich absorbent is heated against the relatively hot lean absorbent leaving the stripper at a temperature of about 120° C. Depending on the actual dimensioning and construction of the plant, the temperature of the rich amine leaving the heat exchanger 7 for the amine stripper may be from about 90 to about 110° C.

$CO_2$ released from the adsorbent and water vapour is withdrawn from the regenerator column 8 through a gas withdrawal line 9. The gas in the gas withdrawal line 9 is cooled in a reflux condenser 14 to condense water that is separated from the remaining gas, mainly comprising $CO_2$, in a $CO_2$ separator 15. $CO_2$ gas and some remaining water vapour is removed from the $CO_2$ separator 15 through a $CO_2$ line 16 for further treatment, such as drying, compression and deposition. The condensed water in the $CO_2$ separator is withdrawn through a line 17 and pumped back to the top of the regeneration column 8 by means of a pump 18.

A reclaimer line 20 is connected to the line 10 for withdrawal of a portion of the lean amine in line 10. The lean amine in the reclaimer line 20 is introduced into a reclaimer 21 where the amine is heated by means of a suitable heat source, such as e.g. electricity or steam. When steam is used as heat source hot steam is introduced into a heating coil in the reboiler from a steam line 22. Condensed steam is withdrawn through a steam withdrawal line 22'. Alkaline is preferably provided for injection into the reclaimer via an alkaline line 27.

Amine and water is evaporated in the reclaimer to give a mixture of gaseous amine, CO2 and steam that is withdrawn through a reclaimer withdrawal line 23. The mixture of gaseous amine, CO2 and steam is introduced into the regeneration column 8 as stripping gas.

A slurry of amine, water, in-soluble and soluble salts, and other chemicals is collected at the bottom of the reclaimer and is removed through an amine waste line 24 for disposal or waste handling.

Normally, the regeneration column, or stripper is operated under a pressure from slightly above atmospheric pressure, such as from about 1.1 bara, to about 5 bara. Typically, the pressure in the regeneration column is 1.5 to 2.5 bar absolute (bara).

The pressure in the reboiler is normally at the same pressure as the stripper or slightly, such as 0.1 to 1.0 bar, higher. The reclaimer is normally operated at about the same pressure as the reboiler.

The reclaimer may be operated continuously to reclaim amine and withdraw degraded amine and salts at a steady state, or in a discontinuous manner to remove the same unwanted ingredients according to the need therefore.

Figure 2:
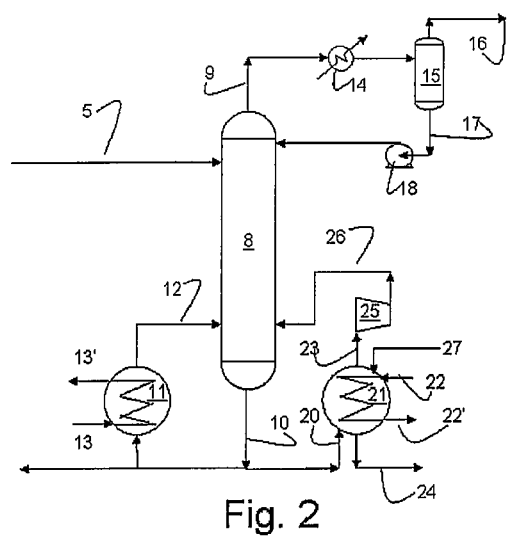
FIG. 2 is a principle sketch of a vacuum reclaiming unit according to the prior art.

FIG. 2 illustrates an alternative embodiment also according to the prior art, wherein a compressor 25 is arranged between the reclaimer 21 and the regeneration column 8 to compress the gaseous mixture in line 23. The compressor 25 is actively withdrawing gas from the reclaimer to generate a reduced pressure therein. The pressurized gas from the compressor 25 leaves the compressor in a line 26 and is introduced into the regeneration column as gas. The main advantage of this design is that the heat used to vaporize the liquid in the reclaimer is not lost. The vapour is fed to the stripper and the heat is recovered.

The main reason for using low pressure reclaiming is to reduce the temperature and hence reduce heat degradation of amine in the reclaimer. Some high boiling amines may not be reclaimed at the same operating pressure as the stripper as degradation rates will be too high at the boiling temperature. Additionally, operating the reclaimer at reduced pressure also reduces the temperature required for the heating medium, for example steam. This often reduces the cost of the heat The cost for reducing the pressure in the reclaimer and compressing the gas mixture is, however, relatively high. The investment cost for the compressor is significant when compared to the cost of a vacuum pump system. Often reclaiming is not a continuous process and therefore the heat loss on an annual basis of using a vacuum pump system is so small that the pay back time for investing in a compressor system will be far too long.

The pressure in a low pressure reclaimer is dependent on the $CO_2$ absorbent to be reclaimed. The pressure is typically regulated so that the boiling point of the absorbent is below the degradation temperature of ingredients in the absorbent. Typically the pressure will be from about 1.5 bara to about 0.3 bara.

Figure 3:
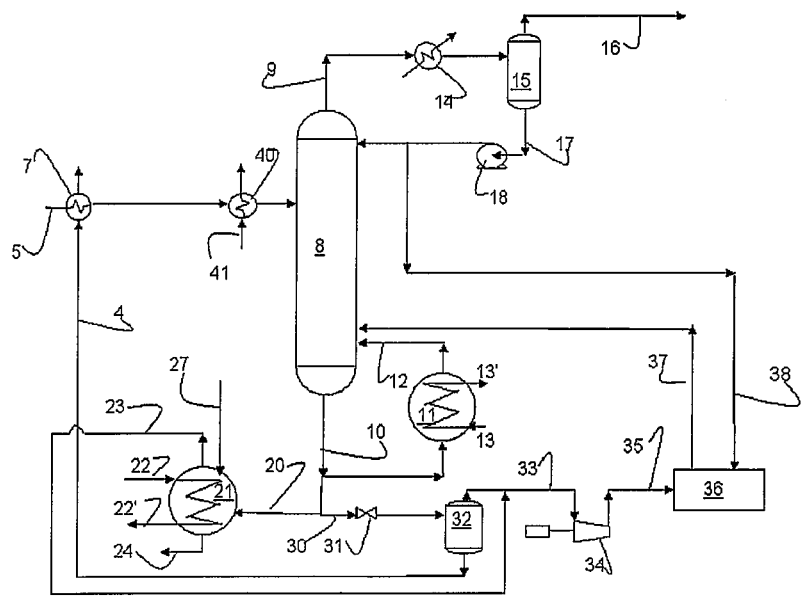
FIG. 3 is a principle sketch of a first embodiment of the present invention.

FIG. 3 illustrates an embodiment of a regeneration plant according to the present invention, for regeneration of an absorbent. The embodiment of FIG. 3 is based on one of the embodiments of the above mentioned WO2008063079.

The operating pressure of the regeneration column 8 as described with reference to FIG. 1 or 2, i.e. typically from about 1.5 to about 2.5 bara.

The lean absorbent leaving the regeneration column 8 in line 10 is split into three streams, a first stream that is introduced into the reboiler 11, as described above, a second steam in a line 30 that is flashed over a flash valve 31 and flash vessel 32, and a third steam that is introduced into a reclaimer 21 through line 20. Alkaline is preferably injected into the reclaimer via the alkaline line 27.

The reboiler 11 in this embodiment corresponds to the above described reboiler.

In the flash vessel 32 the lean absorbent is flashed to give a gas phase and a liquid phase. The gas phase mainly comprises steam and $CO_2$ that have been removed from the lean absorbent by flashing, and some amine. The liquid phase comprises the lean absorbent that is even "leaner" after flashing due to removal of some $CO_2$ by flashing. Flashing also reduces the temperatures of the gas and liquid in the flash vessel. The gas phase in the flash vessel 32 is withdrawn through a line 33 and is then compressed in a compressor 34 to give a compressed, hot, unsaturated $CO_2$ containing steam in line 35. The steam in line 35 is then cooled and saturated by water in a de-superheater 36 in which water is introduced through a line 38 and mixed with the steam from line 35. The resulting water saturated steam from the de-superheater 36 is then returned and injected into to the stripper 8 through a line 37. The water introduced into the de-superheater may conveniently be a part of the water that is condensed in the separator 15.

In the illustrated embodiment, the water in line 38 is withdrawn from line 17, conveniently after the pump 18. The de-superheater 36 is, however, an optional feature and the system may be operated without a de-superheater system where the hot stream is fed directly to the stripper.

The reduced temperature of the lean absorbent due to the flashing over the flash valve 31 results in lowering of the temperature of the absorbent in line 4. The rich medium leaving heat exchanger 7 may therefore have a temperature that is lower than the desired temperature for introduction into the regenerator column 8. An optional heat exchanger 40 heated by a low temperature heat medium in line 41, may therefore be provided to heat the rich absorbent to the desired temperature. The low temperature heat medium entering the heat exchanger 40 through line 41, may e.g. be the heat medium leaving the reboiler 11 in line 13'. The heat medium introduced into the reboiler in line 13 is preferably steam, whereas the heat medium leaving the reboiler in line 13' is condensed water.

Compressing the steam in line 33 increases both the temperature and the pressure of the steam, to produce hot, unsaturated vapour. The absorbent can be degraded by a temperature higher than about 130° C. The water added in the de-superheater 36 ensures that the steam that is introduced into the regeneration column in line 37 is saturated steam having a temperature of 110-140° C.

The term "steam" as used in the present description and claims, is, where appropriate, also intended to include steam that includes other gases, such as e.g. $CO_2$ and vaporized amine.

By compressing the steam in line 33 and thereby adding heat, the low temperature and low pressure steam in line 33 is converted to medium temperature steam and can be fed to the stripper directly. The steam in line 37 substitutes steam from the reboiler in line 12 and hence reduces the duty of the reboiler. Additionally, low temperature heat from the reboiler may find use in the heat exchanger 40. In a plant according to the state of the art, the low temperature heat medium, such as steam condensate leaving the reboiler, is cooled against water in a heat exchanger, and returned to a boiler for generation of medium temperature steam that is returned to the reboiler.

The third stream of lean absorbent is withdrawn through the line 20 and is introduced into the reclaimer as described above with reference to FIGS. 1 and 2. The reclaimer withdrawal line 23 is connected to line 33. Accordingly, the gas in line 23 is introduced into the compressor 23 together with the gaseous phase from the flash tank 32. Withdrawing of the gaseous phase from the reclaimer by means of the compressor 34 results in a reduced pressure with the reclaimer, and accordingly reduced boiling temperature of the liquid in the reclaimer.

The pressure in the reclaimer should be at least 0.2 bar, or at least 0.3 bar, and more preferably more than 0.5 bar, or even more than 0.7 bar lower than the pressure in the regeneration column. At the same time, the pressure in the reclaimer should be lower than 1.5 bara. Depending on the operational pressure in the regeneration column, the configuration of FIG. 3 allows obtaining a pressure in the reclaimer of about 0.7 to 1.5 bara.

The duty of the compressor 34 when used for creation of low pressure in both the flash tank 32 and in the reclaimer 21 is slightly higher than the duty needed for creation of low pressure in the flash tank 32 only. Using only one compressor for obtaining low pressure in both lines 33 and 23 thus substantial reduces the cost over a solution having one compressor for line 23 and another compressor for line 33. The flows in lines 30 and 20 may be adjusted by means of not shown valves in lines 20, 23 and 30 in addition to the flash valve 31. The cost of increasing the size of the steam compressor 34 is minimal.

The main advantage of this design is that it removes the need for a vacuum pump with associated condenser. The vacuum pump and condenser system condenses almost all the vapour from the reclaimer and hence a lot of energy is lost to the cooling medium. In this design, no vapour is condensed and very little energy is lost. Vacuum pump systems are low cost and are therefore the standard method of maintaining low pressure. The reclaimer is often not run at a continuous basis and this manes it even harder to justify the high capital cost of a dedicated compressor for reducing the pressure of the reclaimer.

According to this embodiment of the present invention, there is no compressor dedicated to reduce the pressure in the reclaimer. According to the invention, the compressor will be in continuous operation, and will be used reducing the pressure in the flash tank 32 and compressing the flashed gas in addition to reducing the pressure in the reclaimer. Even if the reclaimer is operated discontinuously, the additional cost of designing the compressor to operate with both gas sources is minimal.

An alkaline line 27 is preferably provided for injection of an alkaline solution into the reclaimer. Preferred alkaline solutions are aqueous solutions of one or more alkali metal hydroxide(s) and/or alkaline earth metal hydroxides. A presently specially preferred alkaline solution as an aqueous solution of sodium hydroxide.

The alkaline solution is added to liberate and recover molecular amine from heat stable salts. The amount of alkaline solution to be added is based upon the concentration of heat stable salts in the amine solution and the stoichiometry of the reaction.

Figure 4:
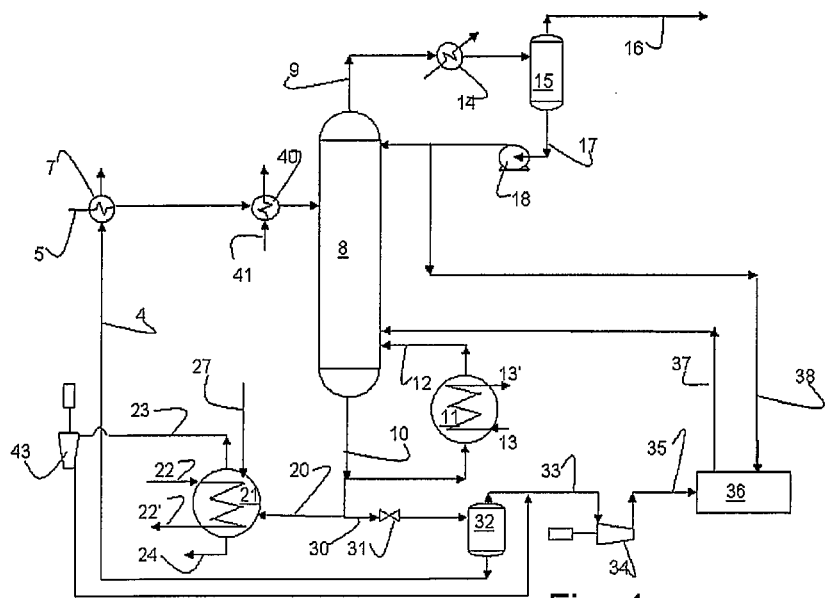
FIG. 4 is a principle sketch of a second embodiment of the present invention.

FIG. 4 illustrates an alternative embodiment of the present invention. This embodiment differs from the embodiment in FIG. 3 by the introduction of a compressor or fan 43 in line 23 to reduce the pressure in the reclaimer even more. This configuration makes it possible to operate the reclaimer at a pressure lower than the lean amine flash in tank 32. The additional compressor 43, may be used during the whole reclaiming process, or only towards the end of a reclaiming cycle to boost the evaporation and concentrate the suspension of solid particles in water that is to be removed through line 24 for deposition. The compressor 43 increases the pressure of the gas in the reclaimer to the same pressure as the inlet to compressor 34. This design has the advantages of the embodiment of the invention as described with reference to FIG. 3, in that no heat is lost from the system, and reducing energy consumption. The cost of compressor 43 is low, when considered against the cost of a compressor to increase the gas pressure up to that of the regeneration column.

By introduction of the compressor 43, the pressure in the reclaimer 21 may be reduced even more than in the embodiment described with reference to FIG. 3, when low pressure is needed to avoid degradation of the absorbent at the same time as an effective evaporation is obtained. The embodiment of FIG. 4 makes it possible to obtain a pressure in the reclaimer of 0.3 bara or less, such as about 0.1 bara, depending on the operating pressure of the regeneration column and the requirements of the process and the absorbent used. The pressure difference between the regeneration column 8 and the reclaimer 21, may in this embodiment is preferably more than 0.7 bar, such as 1 bar or more, such as 1.5 or even 2.0 bar.

Figure 5:
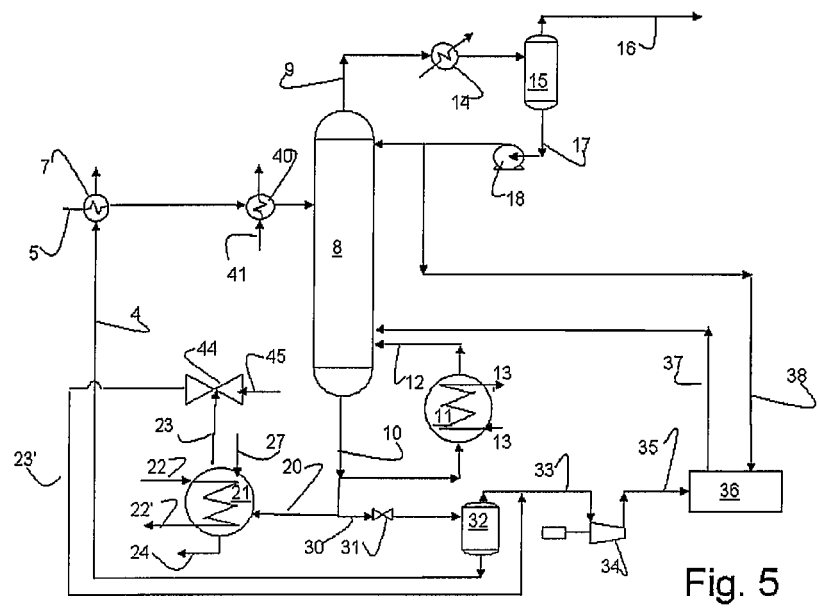
FIG. 5 is a principle sketch of a third embodiment of the present invention.

FIG. 5 is an alternative embodiment of the embodiment illustrated in FIG. 4, where the compressor or fan 43 is substituted by an ejector or venture unit 44. A propellant line 45 connected to a source of pressurized gas, is provided to introduce the driving gas into the venture 44. Typically the driving gas will be steam. The steam will mix with the vapours from the reclaimer and enter the stripper. Venture, or ejector, units have low compression efficiency. Therefore, it is not usually economical or energy effective to run the ejector continuously. However, often it is necessary to operate the reclaimer at low temperatures at the end of the reclaiming cycle. The ejector provides a low cost alternative to a compressor.

Figure 6:
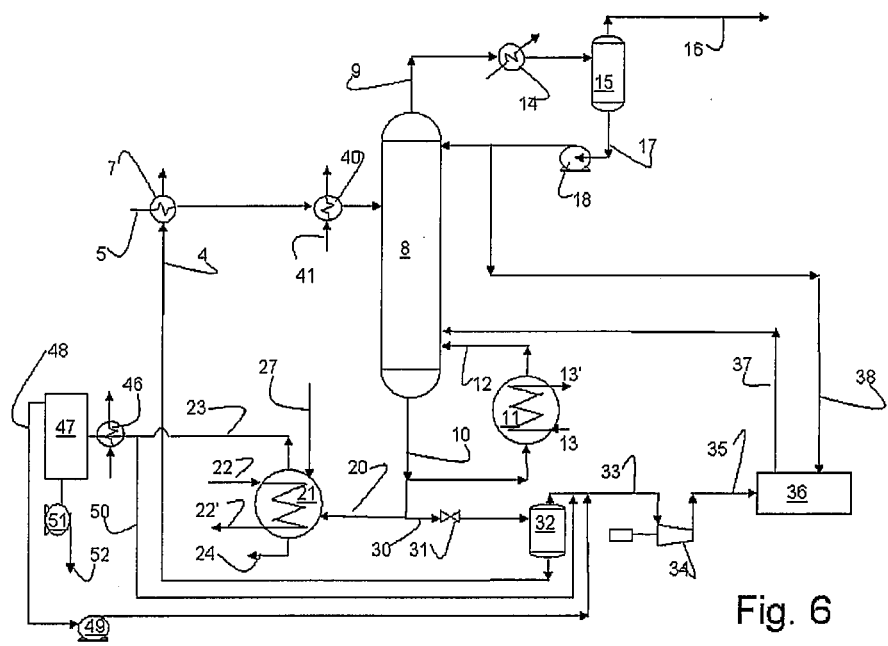
FIG. 6 is a principle sketch of a fourth embodiment of the present invention.

FIG. 6 illustrates a further embodiment of the vacuum reclaiming of FIG. 3. The gaseous mixture in the reclaimer withdrawal line 23 is cooled by means of a cooler 46 to give a condensate stream of water and amine that is separated in a separation vessel 47 to give a liquid phase that is withdrawn through liquid withdrawal line 52 via a pump 51 and then returned to the process, e.g. in the lean amine system. The gaseous phase in the separation vessel 47 is withdrawn through a line 48. A vacuum pump 49 is provided on line 48 to boost the pressure of the gas therein before the gas is introduced into line 33 to be compressed as described above. A direct line 50 is provided from line 23 to line 33. It is often necessary to operate the reclaimer at reduced pressures at the end of a reclaiming cycle. FIGS. 4 and 5 have given examples of how his might be achieved. FIG. 6 gives another example. Under normal operation the cooler, separation vessel and vacuum pump will be bypassed. The claimer will operate at the same pressure as the inlet to the compressor. At the end of the cycle, the vacuum pump system will be used to reduce the pressure more and complete the reclaiming process. The key disadvantage of using a condenser and vacuum pump, is that there is a large loss of heat (energy) to the cooling medium. By operating without the cooler for most of the cycle, the heat is conserved, even though heat will be lost at the end of the cycle.

The preferred pressure in the reclaimer is dependent on the compounds, e.g. amines and alkanolamines, that are included in the absorbent to be reclaimed. Depending on the actual compounds, the pressure in the reclaimer may be as high as 1.5 bara, if the regeneration column is operating at even higher pressures, and as low as about 0.1 bara. The choice of actual configuration on the plant depends on the pressure difference required from the regeneration column to the reclaimer. If the pressure difference between the regeneration column and the reclaimer is not too high, such as about 1 bar, or lower, such as 0.5 bar, 0.3 bar or 0.2 bar, the embodiment described with reference to FIG. 3, is preferred, as it provides the simplest and less expensive solution. If a higher pressure difference is required, the embodiment according FIG. 4 or 5 are the configurations of choice. The embodiment of FIG. 6 allows the highest pressure difference.

The invention is described with reference to the use of an aqueous solution of an amine or a mixture of amines as a $CO_2$ absorbent. The skilled man in the art will, however, understand that the invention also is applicable to other known, suggested or later developed absorbents. Accordingly, the invention is not limited to the use of amines as absorbents. The presently preferred amines to be used in connection with the present invention are, however, amines such as the amines mentioned in the introductory part of the present description.

The skilled man in the art will understand that an optional arrangement for line 20 is to connect line 20 to line 4 to withdraw lean absorbent after flashing to the reclaimer.

Additionally, all the figures show a thermosyphon reboiler. The invention is also relevant with other types of reboiler including kettle reboilers. The figures and description show lean amine entering the reclaimer directly from the stripper, the invention is also relevant when lean amine is fed from the flash drum to the reclaimer.

In the description of the prior art and different embodiments of the present invention, description of elements that are common for two or more figures or embodiments may only be identified and specifically mentioned on their first occurrence in the description. Accordingly, all elements in a figure are not specifically described with relation to this figure if the elements are mentioned with in the description of a different embodiment and the element and function thereof is corresponds to the earlier mentioning of the element.

The invention claimed is:

1. A method for reclaiming one or more $CO_2$ absorbing chemical(s) from a lean aqueous $CO_2$ absorbent leaving a regeneration column in which $CO_2$ has been released, or desorbed, from the lean aqueous $CO_2$ absorbent, and the released $CO_2$ is withdrawn from a top of a regeneration column for further treatment, and the lean aqueous $CO_2$ absorbent, or $CO_2$ depleted absorbent, is collected at a bottom of the regeneration column and withdrawn therefrom, where at least a part of the lean aqueous $CO_2$ absorbent leaving the regeneration column is introduced into a reboiler where the lean aqueous $CO_2$ absorbent is heated to generate steam and vaporized absorbent that is introduced into the regeneration column as stripping gas, where the lean aqueous $CO_2$ absorbent is withdrawn and is returned to an absorption column, and where a part of the lean aqueous $CO_2$ absorbent is withdrawn and introduced into a reclaimer in which the lean aqueous $CO_2$ absorbent is boiled to generate a gas phase that is withdrawn and returned into the regeneration column as reclaimed absorbent, and a liquid phase containing impurities, heat stable salts, and degradation products from absorbing chemical(s) and other chemicals that are withdrawn from the reclaimer for deposition, wherein the lean aqueous $CO_2$ absorbent withdrawn from the regeneration column is flashed to generate a vapour that is compressed and returned into the regeneration column as stripper gas, and a liquid phase that is returned to the absorption column, where the gaseous phase that is withdrawn from the reclaimer is compressed together with a vapour part from flashing of the lean absorbent, to generate a pressure in the reclaimer that is lower than a pressure in the regeneration column.

2. The method of claim 1, wherein the pressure in the reclaimer is further reduced by means of a suction means for withdrawal of the gaseous phase from the reclaimer.

3. The method of claim 2, wherein the suction means is a vacuum system, an ejector or a compressor.

4. The method of claim 1, wherein the pressure in the reclaimer is at least 0.2 bar lower than the pressure in the regeneration column.

5. The method of claim 4, wherein the pressure in the reclaimer is at least 0.3 bar lower than the pressure in the regeneration column.

* * * * *